July 21, 1964 E. JESTER 3,141,194
GAS DELIVERY NOZZLE FOR FILM CASTING APPARATUS
Filed Feb. 9, 1962

United States Patent Office 3,141,194
Patented July 21, 1964

3,141,194
GAS DELIVERY NOZZLE FOR FILM CASTING APPARATUS
Edward Jester, Wilmington, Del., assignor to Avisun Corporation, Philadelphia, Pa., a corporation of Delaware
Filed Feb. 9, 1962, Ser. No. 172,217
8 Claims. (Cl. 18—15)

The present invention relates to melt casting of shaped plastic articles, and more particularly to an improved nozzle for impinging a controlled stream of gaseous medium against the exposed surface of a shaped stream of molten polymeric material as it is extruded upon a moving chill surface.

In accordance with a conventional method of forming films from thermoplastic polymeric materials, as for example polyethylene and polypropylene, the molten polymer is extruded as a continuous shaped stream onto a moving chill surface where it is cooled to provide a film structure. Insofar as the degree of crystallinity and the optical properties of the resulting film are to a large degree dependent upon the rate at which the extruded stream is chilled, various proposals have been made for effecting a more rapid cooling of the shaped stream of molten polymeric material as it is received on the moving chill surface. One of such proposals involves impinging a stream of gaseous medium against the exposed surface of polymeric material so as to urge the same snugly against the moving chill surface. While this procedure has provided for some benefit, the films produced often possess haze streaks and stretch bands which exhibit higher haze values and/or the effects of more stretching than adjacent areas of the films. Accordingly, a primary object of this invention is to provide a generally new or improved and more satisfactory apparatus for use in making films by melt casting of molten thermoplastic polymeric material.

Another object is the provision of an improved apparatus for directing a controlled and more uniform stream of gaseous medium against the exposed surface of a shaped stream of molten polymeric material as it is received on a moving chill surface.

Still another object is the provision of a nozzle, which includes a plenum chamber, for impinging a narrow stream of gaseous medium against a shaped stream of molten polymeric material with substantially uniform pressure along its central portion and with equal but greater pressure along the longitudinal edges thereof.

These and other objects and advantages of the invention will be more apparent from the following description and accompanying drawing.

As heretofore mentioned, the nozzle of the present invention is designed for use in chill casting of films wherein a shaped stream of molten polymeric material is engaged snugly with a moving chill surface under the influence of a gaseous medium impinged against its exposed surface. While this general procedure has been heretofore employed, the resulting films often possess haze streaks and stretch bands which thus render the same unsuitable for many uses. The cause of such haze streaks and stretch bands has been attributed to many different factors, such as temperature differentials along the die employed in shaping of the polymeric material into a desired stream, a build-up of polymer additives or other materials along the moving chill surface, and even differences in the polymeric material itself.

The nozzle of the present invention is based upon the discovery that haze streaks and stretch bands can be greatly minimized, if not completely eliminated, by urging the polymer stream against the chill surface under a substantially uniform pressure along its entire or at least the greater portion of its width, and preferably with equal but greater pressure being applied to the shaped polymer stream along the longitudinal edges thereof. In addition to avoiding objections as noted above, it has been found that under the conditions as provided by the nozzle of the present invention, edge wobble of the shaped stream of polymeric material, which is apparently due to surging in the extrusion device itself, is greatly minimized thus further reducing operating difficulties and the amount of waste during subsequent trimming procedures.

Basically, the nozzle of the present invention includes a manifold into which a gaseous medium is delivered under pressure, a plenum chamber which receives the gaseous medium from the manifold, and a pair of blades which together define a discharge orifice. Introducing the gaseous medium through a central inlet, as in conventional nozzle structures, involves problems in establishing uniform distribution of the gaseous medium before it is discharged, and necessitates that the gaseous medium be initially delivered under a sufficiently high pressure to compensate for losses during its distribution within the nozzle itself. Accordingly, with the nozzle of the present invention, the gaseous medium is delivered into the manifold from opposite ends thereof, and preferably through screened openings which would or at least tend to impart a generally uniform direction to all portions of the normally turbulent streams of gaseous medium as they initially enter into the manifold.

The plenum chamber in the nozzle of the present invention receives the gaseous medium from the manifold as a single stream and serves primarily to contain the gaseous medium while it is given an opportunity for pressure differences to redistribute or equalize themselves. From the plenum chamber the now blended gaseous medium flows in-between the nozzle blades as a single stream, all portions of which are moving at substantially the same velocity. The nozzle blades are formed with smooth internal surfaces and serve to give the stream of gaseous medium direction without inducing turbulence. Along this line, the nozzle blades themselves are of substantially greater width than those of conventional nozzle structures, as measured in the direction of gas flow, so that the gaseous medium is gradually confined or compressed into a narrow stream without creating pressure differences or turbulence therein.

Of particular importance in the nozzle of the present invention are the shape and size of the openings connecting the plenum chamber with the manifold and the space defined by the nozzle blades. In each of these instances, the opening is in the form of a single elongated slot, rather than a series of small openings as employed in conventional nozzle structures. In this manner, the gaseous medium, travels into and out from the plenum chamber without inducing turbulence or pressure differences therein. Preferably, each of these openings or slots should extend along the entire length of the plenum chamber to avoid narrowing of the stream of gaseous medium as it enters into and leaves such chamber.

If desired, the exit opening or slot in the manifold may be shorter than the length of the plenum chamber itself. The exit opening from the plenum chamber, however, should extend along its entire length so that the stream of gaseous medium is free of turbulence and/or pressure differences as it enters in-between the nozzle blades. Under the above conditions, it will be noted that the manifold walls which extend between the ends of the slot and the adjacent ends of the plenum chamber would obstruct and deflect the end portions of the streams of gaseous medium along converging paths so that such stream is actually reduced to a width less than the length of the exit slot itself. Fortunately, in the nozzle of the present invention the plenum chamber permits turbulence and/or pressure differences within such gaseous stream to be relieved or redistributed before such stream flows in-between the nozzle blades.

With the nozzle of the present invention as thus far described the gaseous medium issuing from between the nozzle blades impinges against the shaped stream of molten polymeric material with a substantially uniform pressure along its entire width. As a result, the stream of molten polymeric material is snugly and uniformly urged against the chill surface so that the resulting quenched film is free of haze streaks and stretch bands.

To achieve still further advantages, it is desirable to have the edge portions of the shaped stream of molten polymeric material urged snugly against the chill surface with a force higher than that exerted against the portion of the polymer stream extending between such edges. Under this condition, the edge portions of the shaped streams of molten polymeric material are rapidly chilled and held in position against the chill surface so that surging or other non-uniform flow characteristics which may originate in the extruding device are not generally reflected along the edges of the resulting film as "edge wobble." Further, under the pressure of the gaseous medium which is impinged against the edges of the shaped stream of molten polymeric material, beads of polymer which normally form along such edges are flattened and concomitantly cooled and thus do not appear in the finished film.

In one embodiment of the present invention, the above results are achieved by directing individual jets of gaseous medium against the longitudinal edges of the shaped stream of polymeric material simultaneously as such shaped stream is impinged across its entire width with gaseous medium under a substantially uniform pressure. The individual jets of gaseous medium may be supplied by tubes projecting between the nozzle blades or located outwardly of the nozzle itself. Preferably, such tubes are provided with conventional nozzle heads designed to discharge the gaseous medium in an elliptical spray pattern, and which are so positioned that the major axis of each of such ellipitical spray patterns is substantially parallel to the adjacent edge of the shaped polymer stream.

In a second embodiment of the invention the nozzle walls, which close the ends of the chamber defined by the nozzle blades, are disposed along converging planes so as to gradually reduce the width of such chamber. The gaseous medium issuing from the nozzle orifice, and particularly the gaseous medium which is directed against the longitudinal edges of the shaped polymer stream, is thus under a greater pressure than the remaining portion of such gaseous stream.

With both of the described embodiments, the measures taken to more forcefully urge the edge portions of a shaped polymer stream against a moving chill surface has little or no effect on the remaining or central portion of the impinging stream of gaseous medium which serves to press the shaped polymer stream snugly against the chill surface with a substantially uniform pressure almost entirely across its width.

The advantages of the nozzle of the present invention are not generally dependent on the gaseous medium employed or the polymeric material which is being cast into a film form. From the standpoint of economy, compressed air is preferred for urging the shaped stream of polymeric material against the chill surface and, if desired, such air may be pre-cooled to suit particular operating conditions. Further, while the nozzle of the present invention is suitable for use with a variety of thermoplastic polymeric materials, for the sake of simplicity and ease of description, the nozzle is hereafter described as employed in the manufacture of films from proplyene polymers.

For a more detailed description of the invention, reference is made to the drawing in which.

Figure 1:
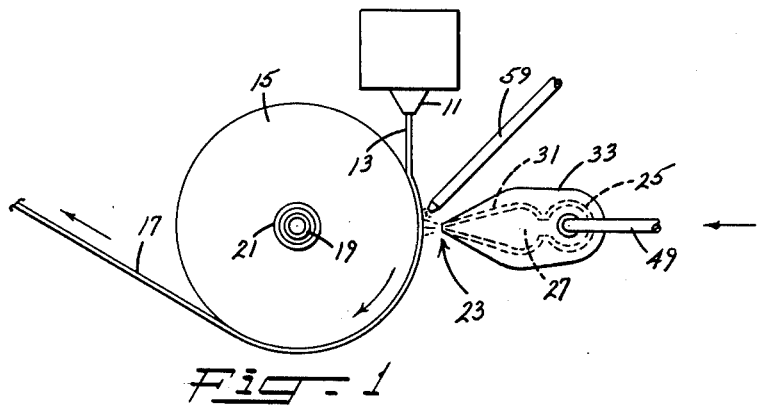
FIGURE 1 is a side view of an apparatus employed in melt casting of films from thermoplastic polymeric materials which incorporates the nozzle of the present invention.

With reference to FIGURE 1 of the drawing, molten polypropylene is extruded from a die 11 as a continuous shaped stream 13 which is received on the periphery of a moving chill drum or roll 15 where it is cooled to provide a film 17. The die 11 is normally positioned close to the chill drum surface and includes a pair of lips which together cooperate to provide an extrusion orifice of desired size.

The peripheral surface of the chill drum 15 is preferably cooled by circulating water or other cooling fluid along its internal surface. Such cooling fluid may be delivered into and discharged from the drum as by conduits 19 and 21, respectively. The temperature and flow rate of the cooling fluid must be such as to maintain the chill drum surface at a temperature well below the melting point of the extruded polymer to insure rapid cooling of the same.

Figure 2:
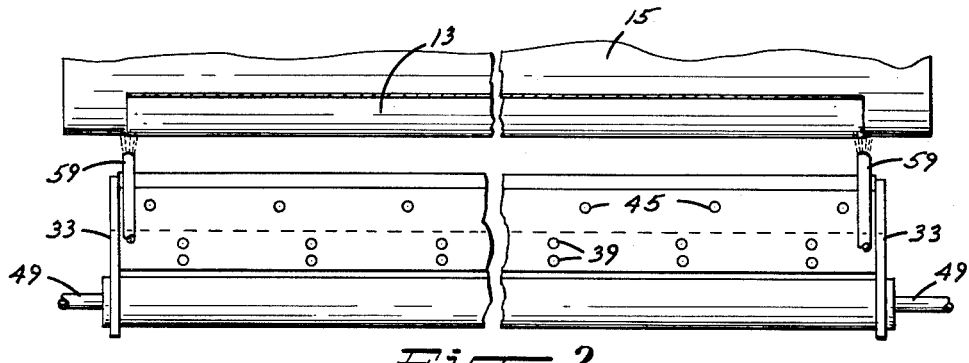
FIGURE 2 is a plan view of a portion of the apparatus shown in FIGURE 1.
Figure 3:
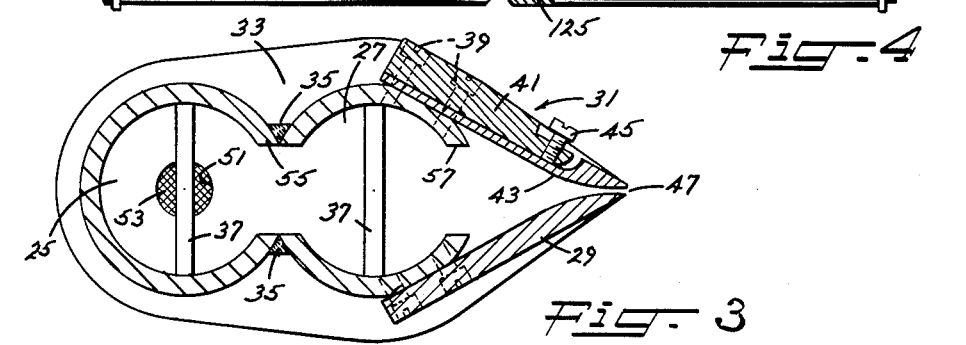
FIGURE 3 is a transverse section taken through the nozzle shown in FIGURE 2.

As the extruded stream of molten polypropylene 13 is received upon the chill drum 15, its exposed surface is impinged by a narrow stream of inert gas, and preferably air, which urges the polymer stream into snug contact with the chill drum periphery, thus displacing air and/or gaseous products which may be entrapped therebetween. The impinging gas stream is supplied under pressure by a nozzle 23 which, as shown in FIGURES 2 and 3, includes walls forming a manifold 25 and a plenum chamber 27, a pair of nozzle blades 29 and 31 and end plates 33. From the standpoint of ease of manufacture, the walls forming the manifold 25 and plenum chamber 27 may be shaped separately and then welded as shown at 35 to provide an integral unit, and are reinforced against collapse and expansion by struts 37 located at spaced intervals longitudinally thereof.

The nozzle blades 29 and 31 are secured to the walls of the plenum chamber 27 by bolts 39 and are formed with internal surfaces which are of a smooth contour. The blade 31 includes a rigid outer section 41 and a resilient lip section 43, the latter of which may be flexed as by screws 45 toward and away from the adjacent end of the blade 29 to vary the size of a nozzle orifice 47.

In use, an inert gaseous medium, as for example air, is delivered under pressure into the opposite ends of the manifold 25 by conduits 49. Preferably, the inlet openings 51 of the manifold 25 are covered with screens 53 which give or at least tend to impart a generally uniform direction to all portions of the normally turbulent streams of gaseous medium as they are delivered by the conduits 49. Within the manifold the delivered streams of gaseous medium blend together into a single stream which flows into the plenum chamber 27 through a connecting slot or opening 55 which extends along the entire length of the plenum chamber. Upon entering the plenum chamber 27, the gaseous medium expands and differences in pressure are given an opportunity to redistribute themselves or be equalized so that substantially all portions of the gaseous medium are moving at the same velocity as such stream flows through the plenum chamber exit slot 57 and in between the nozzle blades 29 and 31. The slot 57 is similar to the slot 55 in that it extends along the entire length of the plenum chamber 27 and thus avoids introducing any turbulence or pressure difference into the stream of gaseous medium at this stage.

The gaseous medium is then discharged through the nozzle orifice 47 as a narrow stream which impinges against the exposed surface of the shaped stream of molten polymer with substantially uniform pressure along its entire length. The polymer stream 13 is thus pressed snugly against the chill drum surface, displacing air and/or other gaseous products which may be entrapped therebetween and being rapidly cooled into a film 17. As a result of the uniform pressure exerted against the exposed surface of the shaped polymer stream by the impinging stream of gaseous medium, simultaneous and uniform cooling of the polymer stream across its entire width is achieved so that the film produced is free of stretch bands and haze streaks.

To still further improve the appearance of the film 17, and additionally minimize waste, the nozzle of the present invention is also equipped with conduits 59 for directing jets of gaseous medium against the edges of the shaped polymer stream 13 under a pressure slightly greater than that exerted by the gaseous medium issuing from the nozzle orifice 47. The conduits 59 may be positioned between the nozzle blades 29 and 31, but are preferably located as shown in FIGURES 1 and 2 of the drawing. Nozzle heads which are designed to discharge the gaseous medium in an elliptical spray pattern are provided on each conduit 51 and are oriented so that the major axis of each of such elliptical spray patterns of gaseous medium is substantially parallel to an adjacent edge of the polymer stream. By more forcefully urging the longitudinal edge portions of the extruded stream of molent polymeric material against the chill drum surface, such portions are more rapidly cooled and fixed against movement so that variations along the edges of the polymer stream, as extruded, are not reflected along the edges of the finish film 17. Further, under the pressure of such jets of gaseous medium beads of polymer, which are normally present along the edges of the shaped stream 13, are flattened so that less waste is produced during subsequent slitting operations.

Figure 4:
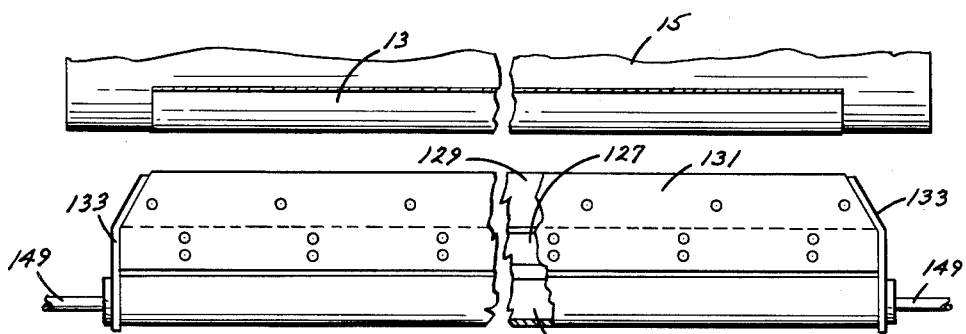
FIGURE 4 is a view similar to that of FIGURE 2 illustrating a second embodiment of the invention.

The embodiment of the invention shown in FIGURE 4 is similar to that shown in FIGURE 2 and includes a manifold 125, a plenum chamber 127, nozzle blades 129 and 131 and end plates 133. The primary difference in these nozzle structures resides in the end plates themselves. In lieu of positioning the end plates along substantially parallel planes as shown in FIGURE 2, the end plates 133 of the modified nozzle shown in FIGURE 4 extend along converging planes at least in the areas adjacent to the nozzle blades.

With this modified arrangement, air or other gaseous medium is delivered into the opposite ends of the manifold 125 by conduits 149, preferably through screened openings as in the structure shown in FIGURES 2 and 3. The delivered streams of gaseous medium are combined into a single stream within the manifold 125 and flow into the plenum chamber 127 through a slot, similar to the slot 55 in the nozzle 25, which extends the entire length of the manifold. Within the plenum chamber 127 the gaseous medium expands and redistributes itself so that differences in pressure which may be present are equalized. The stream of gaseous medium flows from the plenum chamber 127 and in-between the blades 129 and 131 through a slot which extends along the entire length thereof and is similar to the slot 57 in the structure shown in FIGURE 3. The stream of gaseous medium is gradually compressed as it travels between the converging nozzle blades and is, in addition, narrowed in a transverse direction by the converging portions of the end plates 133. The gaseous medium deflected by the end plates 133 is thus provided with a greater velocity than the remaining portion of the stream issuing from the nozzle orifice and, when impinged against the edge portions of the shaped stream of polymer 13, effects substantially the same results as that achieved by the jets of gaseous medium discharged by conduits 59 heretofore described.

It is to be understood that changes and variations may be made without departing from the spirit and scope of the invention as defined in the appended claims.

I claim:
1. In an apparatus for casting of films from molten thermoplastic material which includes a die for extruding a shaped stream of molten thermoplastic material, a chill surface for receiving the extruded stream of molten thermoplastic material and cooling the same into a film, means for moving the chill surface at a uniform predetermined rate, means for maintaining the chill surface at a selected temperature, an improved nozzle for impinging a stream of gaseous medium against the shaped stream of molten thermoplastic material with substantially uniform pressure at least across a portion of the width thereof, said nozzle including an elongated manifold, a plenum chamber extending at least coextensively with said manifold, walls defining an elongated opening interconnecting said manifold and plenum chamber, a pair of spaced blades connected to said plenum chamber and together defining an exit orifice, an elongated slot in said plenum chamber opening in-between said blades, said elongated opening and slot each being narrower than the said plenum chamber, plates extending across the ends of said manifold, plenum chamber, and blades, and means for delivering gaseous medium into the opposite ends of said manifold through inlet openings formed in said plates.

2. Apparatus as defined in claim 1 wherein said elongated slot extends coextensively with said plenum chamber, and further including screens across said inlet openings for imparting direction to said gaseous medium as it is delivered.

3. Apparatus as defined in claim 2 wherein the portions of said plates extending across the ends of said blades are disposed along planes which converge in the direction of said exit orifice.

4. Apparatus as defined in claim 1 further including conduits for impinging gaseous medium against the longitudinal edges of the shaped stream of molten thermoplastic material with a greater pressure than the gaseous medium issuing from the nozzle exit orifice.

5. In an apparatus for casting of films from molten thermoplastic material which includes a die for extruding a shaped stream of molten thermoplastic material, a chill surface for receiving the extruded stream of molten thermoplastic material and cooling the same into a film, means for moving the chill surface at a uniform predetermined rate, means for maintaining the chill surface at a selected temperature, an improved nozzle for impinging a stream of gaseous medium against the shaped stream of molten thermoplastic material with substantially uniform pressure at least across a portion of the width thereof, said nozzle including an elongated manifold, a plenum chamber extending at least coextensively with said manifold, walls defining an elongated opening interconnecting said manifold and plenum chamber, a pair of spaced blades connected to said plenum chamber and together defining an exit orifice, an elongated slot in and coextensive with said plenum chamber opening in-between said blades, said elongated opening and slot each being narrower than said plenum chamber, plates extending across the ends of said manifold, the plenum chamber, and blades, with the portions of said plates which extend across the ends of said blades being disposed along planes which converge in the direction of said exit orifice, and means for delivering gaseous medium into the opposite ends of said manifold through screened inlet openings formed in said plates.

6. A nozzle including an elongated manifold, means for delivering a fluid medium into said manifold from the opposite ends thereof, a plenum chamber extending at least coextensive with said manifold, walls defining an elongated opening interconnecting said manifold and plenum chamber, a pair of spaced blades connected to said plenum chamber and together defining an exit orifice, an elongated slot in said plenum chamber opening in-between said blades, said elongated opening and slot each being narrower than said plenum chamber and plates extending at least across the ends of said plenum chamber and blades, said plenum chamber providing a space within which pressure differences in the fluid medium may redistribute themselves and be equalized whereby substantially all portions of the fluid medium flow at about the same velocity as such fluid medium is delivered in-between said blades.

7. A nozzle as defined in claim 6 wherein said elongated slot extends coextensively with said plenum chamber, and further including screens across said inlet openings for imparting direction to said fluid medium as it is delivered.

8. A nozzle as defined in claim 6 wherein the portions of said plates extending across the ends of said blades are disposed along planes which converge in the direction of the exit orifice whereby the fluid medium along the edges of the stream issuing from said orifice travels at a greater velocity than the remaining portions thereof.

References Cited in the file of this patent

UNITED STATES PATENTS

| | | |
|---|---|---|
| 2,116,863 | Dinley | May 10, 1938 |
| 2,139,628 | Terry | Dec. 6, 1938 |
| 2,212,770 | Foster | Aug. 27, 1940 |
| 2,289,494 | Hadley et al. | July 14, 1942 |
| 2,366,926 | Melton | Jan. 9, 1945 |
| 2,402,621 | Gifford | June 25, 1945 |
| 2,736,066 | Chren et al. | Feb. 28, 1956 |
| 2,817,114 | Erickson | Dec. 24, 1957 |
| 3,010,659 | Goodrie et al. | Nov. 28, 1961 |
| 3,042,968 | Kraszeski | July 10, 1962 |

FOREIGN PATENTS

| | | |
|---|---|---|
| 561,996 | Italy | May 3, 1957 |
| 1,266,642 | France | June 5, 1961 |